(12) United States Patent
Ha et al.

(10) Patent No.: US 8,979,343 B2
(45) Date of Patent: Mar. 17, 2015

(54) BACKLIGHT ASSEMBLY AND DISPLAY APPARATUS HAVING THE SAME

(75) Inventors: Sang-Woo Ha, Yongin-si (KR); Ju-Hwa Ha, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 268 days.

(21) Appl. No.: 13/603,956

(22) Filed: Sep. 5, 2012

(65) Prior Publication Data

US 2013/0250616 A1 Sep. 26, 2013

(30) Foreign Application Priority Data

Mar. 26, 2012 (KR) .................. 10-2012-0030295

(51) Int. Cl.
| | | |
|---|---|---|
| *F21V 8/00* | (2006.01) | |
| *F21S 4/00* | (2006.01) | |
| *F21S 8/10* | (2006.01) | |
| *F21V 7/09* | (2006.01) | |
| *F21Y 105/00* | (2006.01) | |

(52) U.S. Cl.
CPC ............... *G02B 6/0091* (2013.01); *F21S 4/008* (2013.01); *F21S 48/1388* (2013.01); *F21V 7/09* (2013.01); *F21Y 2105/005* (2013.01)
USPC ........................... 362/609; 362/613; 362/297

(58) Field of Classification Search
CPC ..... G02B 6/0091; G02B 17/002; F21S 4/008; F21S 48/1388; F21S 48/2281; F21V 7/0033; F21V 7/09; F21V 8/00; F21Y 2105/005; F21Y 2111/008
USPC ......... 362/608, 609, 612, 613, 297, 298, 301, 362/249.01, 249.02, 249.06, 249.14
See application file for complete search history.

(56) References Cited

U.S. PATENT DOCUMENTS

| | | | |
|---|---|---|---|
| 5,453,855 A * | 9/1995 | Nakamura et al. ............ 362/613 |
| 2008/0013333 A1* | 1/2008 | Koizumi et al. ............... 362/511 |
| 2010/0208493 A1* | 8/2010 | Choi et al. ..................... 362/606 |
| 2012/0020113 A1* | 1/2012 | Zheng et al. ................... 362/612 |

FOREIGN PATENT DOCUMENTS

| | | |
|---|---|---|
| JP | 2006229973 | 8/2006 |
| JP | 2007048465 | 2/2007 |
| JP | 2008176996 | 7/2008 |
| KR | 0840769 | 6/2008 |

* cited by examiner

*Primary Examiner* — Y M Lee
(74) *Attorney, Agent, or Firm* — H.C. Park & Associates, PLC

(57) ABSTRACT

A backlight assembly including a container having a light exiting boundary, and a light source part. The container includes a first light source supporting part supporting first and second light sources, and a reflector extending from the first light source supporting part. The reflector reflects the light from the first and second light sources to guide the light to the light exiting boundary. The first light source is disposed under the light exiting boundary and generates the light. The second light source is spaced apart from the first light source in a first direction by a first distance. The first direction is substantially parallel with the light exiting boundary. The second light source is spaced apart from the light exiting boundary in a second direction by a first depth. The second direction is substantially perpendicular to the light exiting boundary.

24 Claims, 8 Drawing Sheets

BACKLIGHT ASSEMBLY AND DISPLAY APPARATUS HAVING THE SAME

CROSS-REFERENCE TO RELATED APPLICATION

This application claims priority from and the benefit of Korean Patent Application No. 10-2012-0030295, filed on Mar. 26, 2012, which is hereby incorporated by reference for all purposes as if fully set forth herein.

BACKGROUND

1. Field

Exemplary embodiments of the present invention relate to a backlight assembly and a display apparatus including the backlight assembly. More particularly, exemplary embodiments of the present invention relate to a backlight assembly and a display apparatus including the backlight assembly for a liquid crystal display apparatus.

2. Discussion of the Background

Recently, a liquid crystal display apparatus having light weight and small size has been manufactured. A cathode ray tube (CRT) display apparatus has been used in the past because of its competitive price and relatively good performance. However, the CRT display apparatus suffers from a lack of portability as a result of its comparatively large size and weight. Therefore, the liquid crystal display apparatus has been highly regarded as a result of its small size, light weight, and low power consumption.

Generally, the liquid crystal display apparatus applies a voltage to a specific molecular arrangement configured to change the molecular arrangement. The liquid crystal display apparatus displays an image using changes of optical properties (for example, birefringence, rotational polarization, dichroism and light scattering) of a liquid crystal cell according to the changes of the molecular arrangement.

A typical liquid crystal display apparatus includes a receiving container, a display panel and a backlight assembly. The backlight assembly includes a light source generating light and a light guiding plate guiding the light to the display panel. The backlight assembly generates the light and uniformly supplies the light to the display panel. However, the weight of the typical liquid display apparatus may be increased as a result of the weight of the backlight assembly.

In addition, when the light source is disposed at one side of the light guiding plate, the light from the light guiding plate may not be uniform.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a backlight assembly capable of reducing a weight of a display apparatus, and supplying uniform light to a display panel.

Exemplary embodiments of the present invention also provide a display apparatus including the backlight assembly.

Additional features of the invention will be set forth in the description which follows, and in part will be apparent from the description, or may be learned by practice of the invention.

An exemplary embodiment of the present invention discloses a backlight assembly including a receiving container having a light exiting boundary, and a light source part. Light exits from the light exiting boundary. The receiving container includes a first light source supporting part supporting first and second light sources, and a reflector extending from the first light source supporting part. The reflector reflects the light from the first and second light sources to guide the light to the light exiting boundary. The light source part includes the first light source and the second light source. The first light source is disposed under the light exiting boundary and generates the light. The second light source is spaced apart from the first light source in a first direction by a first distance. The first direction is substantially parallel with the light exiting boundary. The second light source is spaced apart from the light exiting boundary in a second direction by a first depth. The second direction is substantially perpendicular to the light exiting boundary.

According to another exemplary embodiment of the present invention, a display apparatus includes a display panel displaying an image, a backlight assembly and a receiving case receiving the display panel and the backlight assembly. The backlight assembly includes a receiving container having a light exiting boundary, and a light source part. Light exits from the light exiting boundary. The receiving container includes a first light source supporting part supporting first and second light sources, and a reflector extending from the first light source supporting part. The reflector reflects the light from the first and second light sources to guide the light to the light exiting boundary. The light source part includes the first light source and the second light source. The first light source is disposed under the light exiting boundary and generates the light. The second light source is spaced apart from the first light source in a first direction by a first distance. The first direction is substantially parallel with the light exiting boundary. The second light source is spaced apart from the light exiting boundary in a second direction by a first depth. The second direction is substantially perpendicular to the light exiting boundary.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
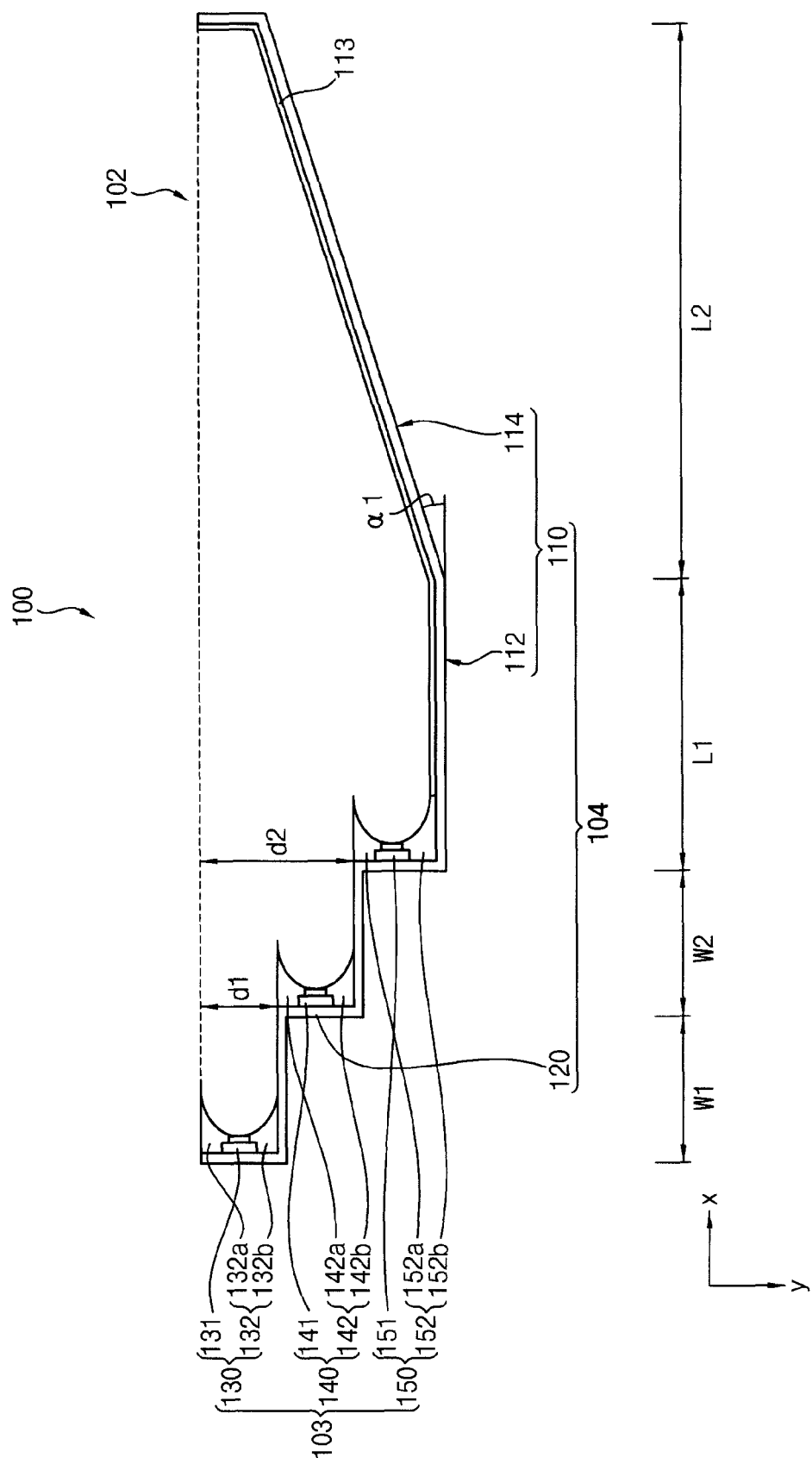
FIG. 1 is a cross-sectional view illustrating a backlight assembly according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a cross-sectional view illustrating a backlight assembly according to an exemplary embodiment of the present invention.

Referring to FIG. 1, the backlight assembly 100 includes a light source part 103 and a receiving container 104.

The receiving container 104 includes a light exiting boundary 102, a light source supporting portion 120 and a reflector 110.

The light exiting boundary 102 is an upper surface of the receiving container 104.

The light exits from the light exiting boundary 102. The light source supporting portion 120 supports the light source part 103. The reflector 110 extends from the light source supporting portion 120 in an x-direction. The reflector 110 reflects the light generated from the light source part 103 so that the light exits through the light exiting boundary 102. The x-direction is in parallel with the light exiting boundary 102. The receiving container 104 will be described in detail later.

The light source part 103 includes a first light source part 130, a second light source part 140 and a third light source part 150. The light source part 103 generates the light for supplying the light to a display panel.

The first light source part 130 includes a first light source 131 and a first reflecting cup 132.

The first light source part 130 is disposed under the light exiting boundary 102. The first light source part 130 is disposed on the light source supporting portion 120. The first reflecting cup 132 surrounds the first light source 131 of the first light source part 130 and is configured to guide the light to the x-direction. The diameter of the first reflecting cup 132 gradually increases along the x-direction. Thus, the light generated from the first light source part 130 proceeds along the x-direction, so that the light may uniformly reach a distance which is far from the light source part 103.

The second light source part 140 includes a second light source 141 and a second reflecting cup 142.

The second light source part 140 is spaced apart from the first light source 131 along the x-direction by a first distance w1. The second light source part 140 is spaced apart from the light exiting boundary 102 along a y-direction and has a first depth d1. The y-direction is substantially perpendicular to the x-direction. The second light source part 140 is disposed on the light source supporting portion 120. Thus, the first light source part 130 and the second light source part 140 are disposed on the light source supporting portion 120 and are configured to form a stepped shape. The second reflecting cup 142 surrounds the second light source 141 of the second light source part 140 and is configured to guide the light to the x-direction. The diameter of the second reflecting cup 142 gradually increases along the x-direction. Thus, the light generated from the second light source part 140 proceeds along the x-direction, so that the light may uniformly reach a distance which is far from the light source part 103.

The third light source part 150 includes a third light source 151 and a third reflecting cup 152.

The third light source part 150 is spaced apart from the second light source 141 along the x-direction by a second distance w2. The third light source part 150 is spaced apart from the light exiting boundary 102 along the y direction with a second depth d2. The third light source part 150 is disposed on the light source supporting portion 120. Thus, the first light source part 130, the second light source part 140 and third light source part 150 are disposed on the light source supporting portion 120 and are configured to form a stepped shape. The third reflecting cup 152 surrounds the third light source 151 of the third light source part 150 and is configured to guide the light to the x-direction. The diameter of the third reflecting cup 152 gradually increases along the x-direction. Thus, the light generated from the third light source part 150 proceeds along the x-direction so that the light may uniformly reach a distance which is far from the light source part 103.

Each of the first light source 131, the second light source 141 and the third light source 151 generate the light which is supplied to the display apparatus. The first light source 131, the second light source 141 and the third light source 151 may include LEDs (light emitting diode).

Each of the first light source 131, the second light source 141 and the third light source 151 may be disposed on a surface substantially perpendicular to the light exiting boundary 102. Thus, the first light source 131, the second light source 141 and the third light source 151 emit the light along the x-direction.

Each of the first reflecting cup 132, the second reflecting cup 142, and the third reflecting cup 152 may have a length of an upper portion (132a, 142a, 152a) which is larger than a length of a lower portion (132b, 142b, 152b) in the x-direction. Thus, amount of the light from the light sources 130, 140, 150 which directly reach the light exiting boundary 102 may be reduced. Accordingly, the light may uniformly reach a distance which is far from the light source part 103.

The reflector 110 includes a flat portion 112 and an inclined portion 114.

The flat portion 112 extends from the light source supporting portion 120 along the x-direction by a first length L1. For example, the flat portion 112 extends from the lower portion 152b of the reflecting cup 152 along the x-direction. The inclined portion 114 extends from the flat portion 112 along the x-direction with a first angle α1. Thus, the inclined portion 114 and the flat portion 112 form the first angle α1. The inclined portion 114 extends by a second length L2 in the x-direction x.

The reflector 110 reflects the light for guiding the light to the light exiting boundary 102. The flat portion 112 and the inclined portion 114 have appropriate lengths, positions, and the first angle α1 according to positions of the second light source 141 and the third light source 151, so that the light exiting form the light exiting boundary 102 may be uniform. For example, as a result of the stepped shape of the light sources 131.141, 151, the light may uniformly reach the light exiting boundary 102 positioned at a distance which is far from the light source part 103.

A reflective layer 113 may be disposed on the inner surface of the receiving container 104. The inner surface faces the light exiting boundary 102. The reflective layer 113 reflects for guiding the light to the light exiting boundary 102. In addition, the reflective layer 113 may include a reflective film which may be coated on the inner surface of the receiving container 104.

The backlight assembly 100 includes a plurality of light sources 131, 141, 151 disposed in the stepped shape, and the reflector 110 has an inclined angle, so that the light exiting form the light exiting boundary 102 may be uniform. In addition, the backlight assembly 100 does not include a light guiding plate which is typically found in a backlight assembly, and guides the light using the bent reflector 110, so that weight of the backlight assembly 100 may be reduced.

According to the present exemplary embodiment, the backlight assembly 100 may have the dimensions shown in the following Table 1.

TABLE 1

| | dimension |
|---|---|
| W1 | 45 mm |
| W2 | 45 mm |
| L1 | 50 mm |
| L2 | 260 mm |
| α | 7° |

The light exiting boundary 102 of the backlight assembly 100 according to Table 1, measures 700 mm*400 mm (length*width). These dimensions are merely examples because, as an ordinary artisan would understand, the backlight assembly 100 may have various dimensions. Thus, the light sources 131, 141, 151 disposed in the stepped shape are disposed along the length direction of the light exiting boundary 102.

Figure 7:
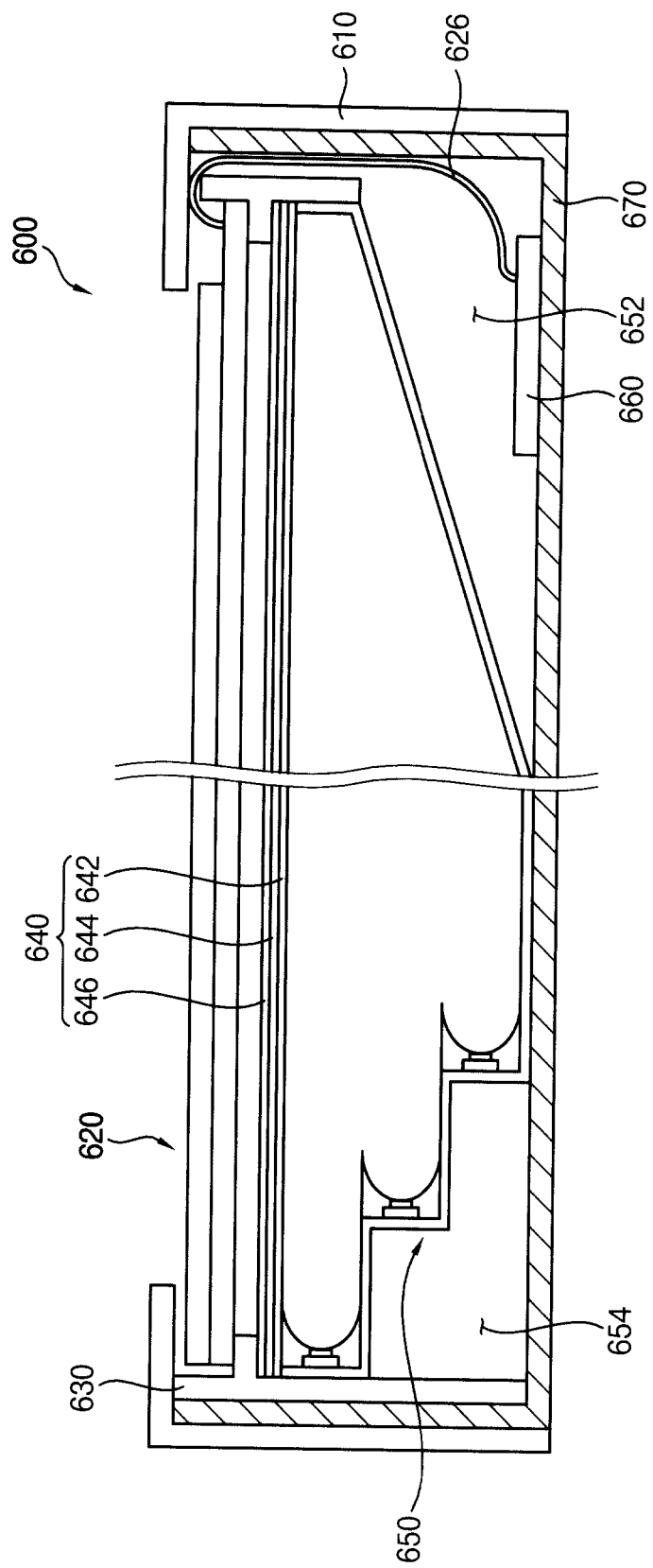
FIG. 7 is a cross-sectional view illustrating the display apparatus of FIG. 6.

The backlight assembly 100 may further include an optical sheet 640, as shown in FIG. 7. The optical sheet 640 is disposed on the light exiting boundary 102.

The optical sheet 640 may include a plurality of sheets. For example, the optical sheet 640 may include a protecting sheet 646, a prism sheet 644, a diffusion sheet 642, etc. The diffusion sheet 642 is disposed on the light exiting boundary 102. The prism sheet 644 is disposed on the diffusion sheet 642. The protecting sheet 646 is disposed on the prism sheet 644. The prism sheet 644 may include an upper prism sheet and a lower prism sheet (not shown). An axis of the upper prism sheet may be substantially perpendicular to an axis of the lower prism sheet. Alternatively, the optical sheet 640 may have various other kinds of sheets. Many modifications of the optical sheet may be possible.

Figure 2:
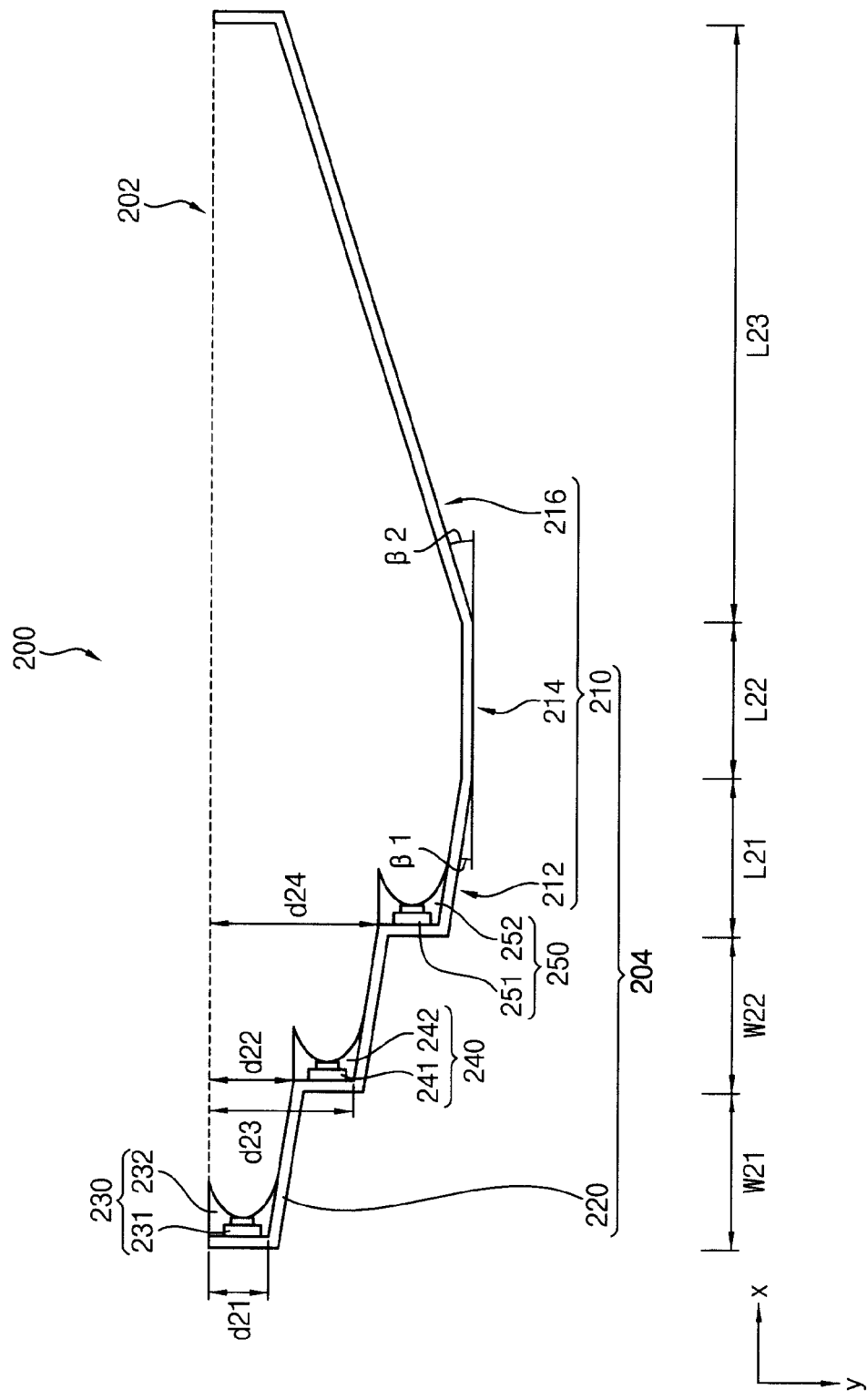
FIG. 2 is a cross-sectional view illustrating a backlight assembly according to a second exemplary embodiment of the present invention.

FIG. 2 is a cross-sectional view illustrating a backlight assembly according to another exemplary embodiment of the present invention.

Referring to FIG. 2, the backlight assembly 200 is substantially the same as the backlight assembly 100 of FIG. 1 except for a light source supporting portion 220 of a receiving container 204 and a reflector 210 of the receiving container 204. As such, only the differences there-between will be described in detail.

The receiving container 204 includes a light exiting boundary 202, the light source supporting portion 220 and the reflector 210. The light source supporting portion 220 has a stepped shape configured to dispose a first light source part 230, a second light source part 240 and a third light source part 250 in the stepped shape.

The first light source part 230 includes a first light source 231 and a first reflecting cup 232.

The first light source part 230 is disposed under the light exiting boundary 202. The first light source part 230 is disposed on the light source supporting portion 220.

The second light source part 240 includes a second light source 241 and a second reflecting cup 242.

The second light source part 240 is spaced apart from the first light source 231 along the x-direction by a first distance w21. The second light source part 240 is spaced apart from the light exiting boundary 202 along the y-direction with a second depth d22. The second depth d22 is larger than a first depth d21. The first depth d21 is a distance between the light source supporting portion 220 and the light exiting boundary 202 at a portion where the first light source 231 is disposed.

The second light source part 240 is disposed on the light source supporting portion 220. Thus, the first light source part 230 and the second light source part 240 are disposed in the stepped shape on the light source supporting portion 220. The second depth d22 is larger than the first depth d21, so that the light source supporting portion 220 between the first light source part 230 and the second light source part 240 may be slanted along the y-direction with reference to the light exiting boundary 202.

The third light source part 250 includes a third light source 251 and a third reflecting cup 252.

The third light source part 250 is spaced apart from the second light source 241 along the x-direction by a second distance w22. The third light source part 250 is spaced apart from the light exiting boundary 202 along the y-direction with a fourth depth d24. The fourth depth d24 is larger than a third depth d23. The third depth d23 is a distance between the light source supporting portion 220 and the light exiting boundary 202 at a portion where the second light source 241 is disposed.

The third light source part 250 is disposed on the light source supporting portion 220. Thus, the first light source part 230, the second light source part 240 and the third light source part 250 are disposed in the stepped shape on the light source supporting portion 220. The third reflecting cup 252 surrounds the third light source 251 to guide the light along the x-direction. The fourth depth d24 is larger than the third depth d23, so that the light source supporting portion 220 between the second light source part 240 and the third light source part 250 may be slanted along the y-direction with reference to the light exiting boundary 202.

The reflector 210 includes a first inclined portion 212, a flat portion 214 and a second inclined portion 216.

The first inclined portion 212 extends from the light source supporting portion 220 along the x-direction by a first length L21. For example, the first inclined portion 212 extends from the lower portion of the third reflecting cup 252 along the x-direction. The first inclined portion 212 is inclined along the y-direction with a first angle β1. Thus, the light may be reflected on the first inclined portion 212 and proceed along the x-direction to a position farther away than when a flat portion is disposed instead of the first inclined portion 212.

The second inclined portion 216 extends from the flat portion 214 along the x-direction by a third length L23. The second inclined portion 216 is inclined toward the light exiting boundary 202 with a second angle β2. Thus, the light is reflected on the second inclined portion 216 toward the light exiting boundary 202.

The reflector 210 reflects the light for guiding the light to the light exiting boundary 202. The first inclined portion 212, the flat portion 214 and the second inclined portion 216 have appropriate lengths, positions, the first angle β1, and the second angle β2 according to positions of the first to third light sources 231, 241, 251, so that the light exiting from the light exiting boundary 202 may be uniform. For example, as a result of the stepped shape of the light sources 231, 241, 251, the light may uniformly reach the light exiting boundary 202 at a position which is far from the light source parts 230, 240, 250. In addition, the light source supporting portion 220 between each of the light sources 231, 241, 251 is inclined along the y-direction, so that the light may be reflected on the reflector 210 and proceed along the x-direction farther than when a flat portion is disposed instead of the first inclined portion 212, the flat portion 214 and the second inclined portion 216.

Figure 3:
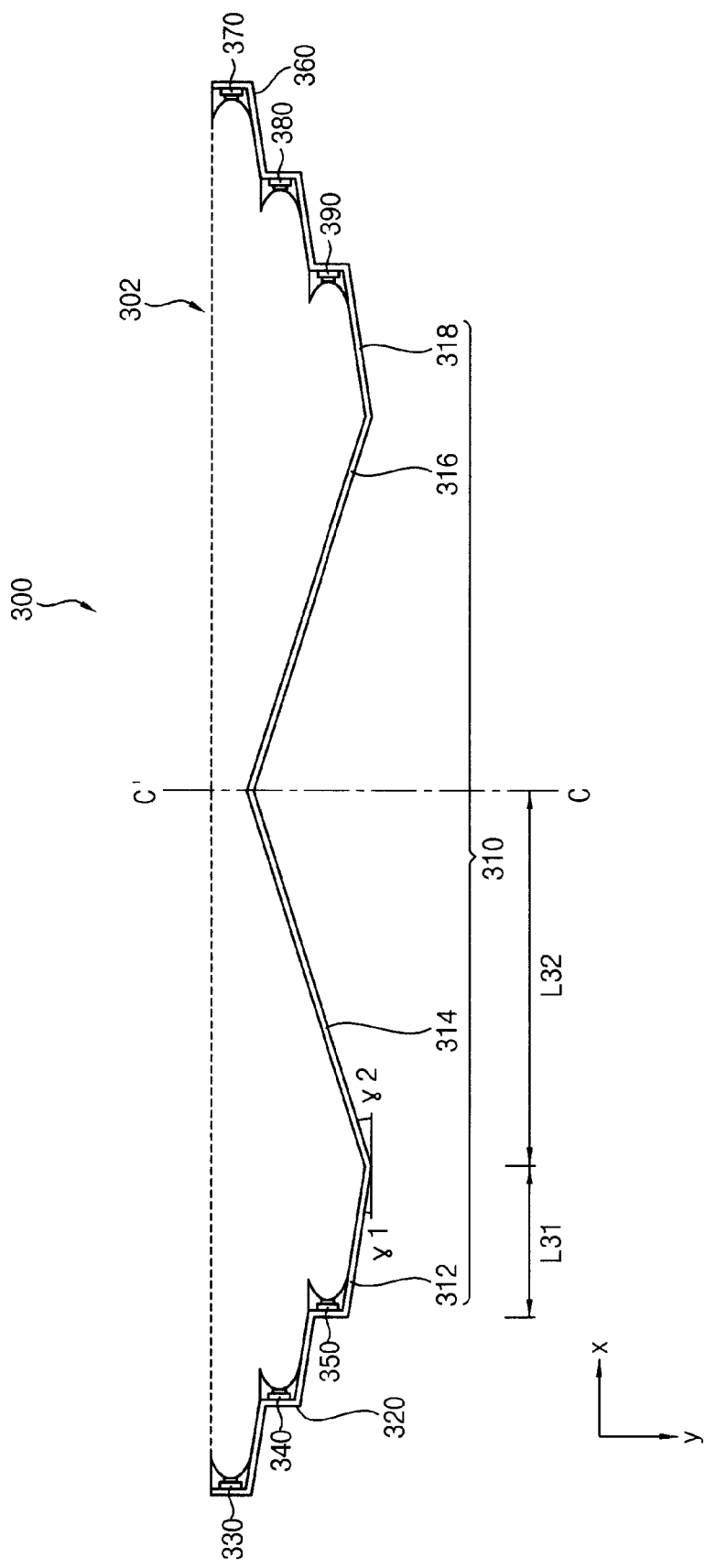
FIG. 3 is a cross-sectional view illustrating a backlight assembly according to a third exemplary embodiment of the present invention.

FIG. 3 is a cross-sectional view illustrating a backlight assembly according to still another exemplary embodiment of the present invention.

Referring to FIG. 3, the backlight assembly 300 is substantially the same as the backlight assembly 200 of FIG. 2, except that the backlight assembly 300 includes a fourth light source part 370, a fifth light source part 380, a sixth light source part 390, a first light source supporting portion 320, and a second light source supporting portion 360, except that the backlight assembly 300 is symmetric with respect to a first surface C-C', and except for reflector 310. As such, only the differences there-between will be described in detail.

The first light source supporting portion 320 has a stepped shape configured to dispose first to third light source parts 330, 340 and 350 in the stepped shape.

The reflector 310 includes a first inclined portion 312, a second inclined portion 314, a third inclined portion 316 and a fourth inclined portion 318.

The first inclined portion 312 extends from the first light source supporting portion 320 along the x-direction by a first length L31. The first inclined portion 212 may be inclined along the y-direction with the second angle γ2. Thus, the light may be reflected on the first inclined portion 212 and proceed along the x-direction x farther than when a flat portion is disposed instead of the first inclined portion 212.

The third inclined portion 316 extends from the second inclined portion 314 along the x-direction. The third inclined portion 316 may be inclined along the y-direction with a first angle γ1. Light from the fourth to sixth light source part 370, 380 and 390 is reflected on the third inclined portion 316 toward the light exiting boundary 302.

The fourth inclined portion 318 extends from the third inclined portion 316 along the x-direction. The fourth inclined portion 318 may be inclined toward the light exiting boundary 302 with the first angle γ1. The fourth inclined portion 318 is connected to the second light supporting portion 360.

The second light source supporting portion 360 has a stepped shape configured to dispose the fourth to sixth light source parts 370, 380 and 390 in the stepped shape.

The backlight assembly is symmetric with respect to the first surface C-C'. Thus, the first to third light sources parts 330, 340 and 350 and the fourth to sixth light source parts 370, 380 and 390 are symmetric with respect to the first surface C-C'. In addition, the reflector 310 is symmetric with respect to the first surface C-C'.

According to the present exemplary embodiment, the backlight assembly may have the dimensions shown in the following Table 2.

TABLE 2

|  | dimension |
| --- | --- |
| W21 | 45 mm |
| W22 | 45 mm |
| L31 | 50 mm |
| L32 | 210 mm |
| γ1 | 6.4° |
| γ2 | 7° |
| d21 | 10 mm |

Figure 4:
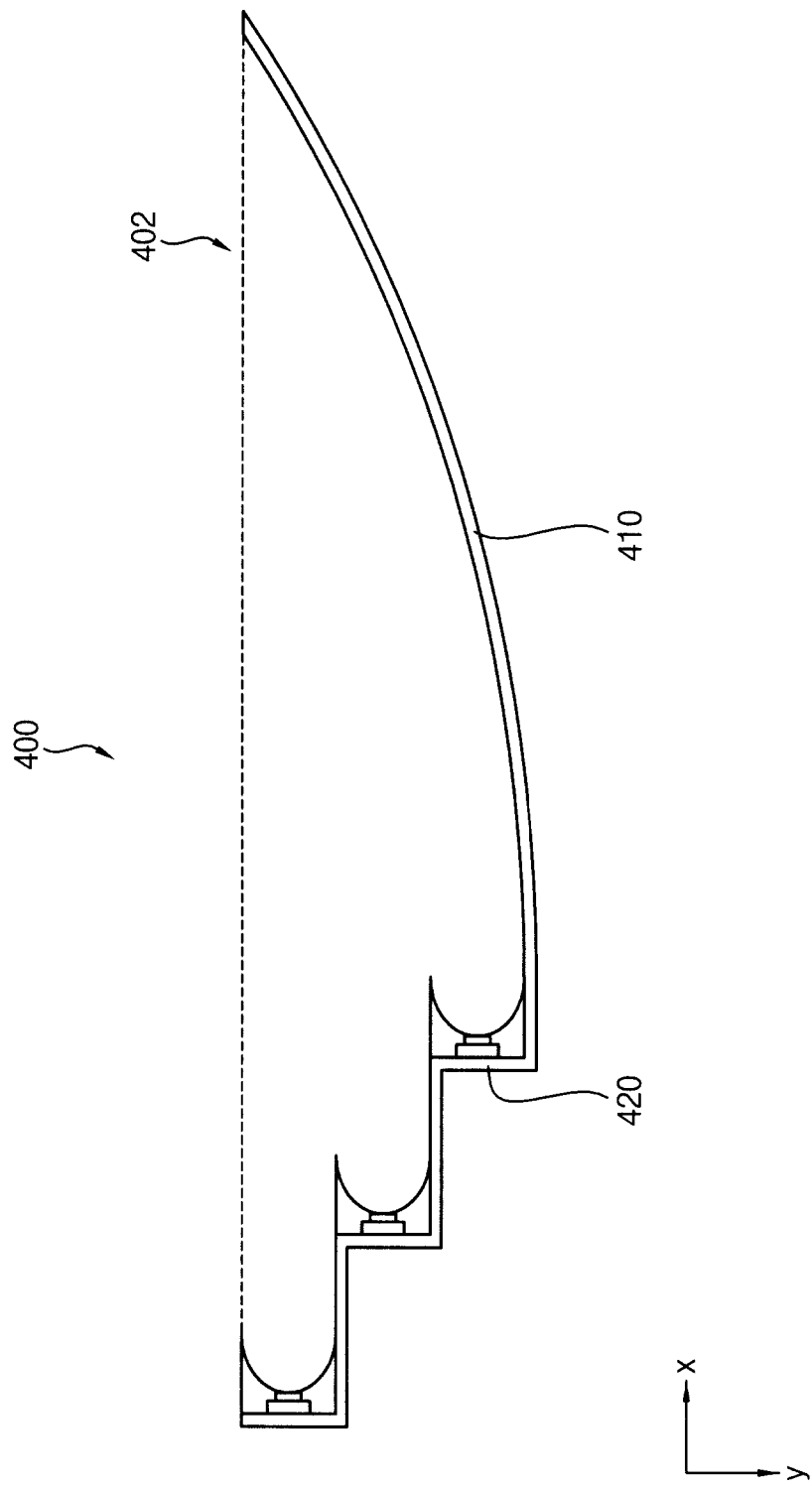
FIG. 4 is a cross-sectional view illustrating a backlight assembly according to a fourth exemplary embodiment of the present invention.

FIG. 4 is a cross-sectional view illustrating a backlight assembly according to still another exemplary embodiment of the present invention.

Referring to FIG. 4, the backlight assembly 400 is substantially the same as the backlight assembly 100 of FIG. 1, except for a shape of a reflector 410 of a receiving container. As such, only the differences there-between will be described in detail.

The reflector 410 extends from the light source supporting portion 420 along a curved line in the x-direction. Thus, the reflector 410 is bent toward the light exiting boundary 402, so that the reflector 410 has a curved surface. Therefore, the light from the light source part may uniformly reach the light exiting boundary 402 far from the light source part. An inclined angle between the reflector 410 and the light exiting boundary 402 may gradually increase along the x-direction.

Figure 5:
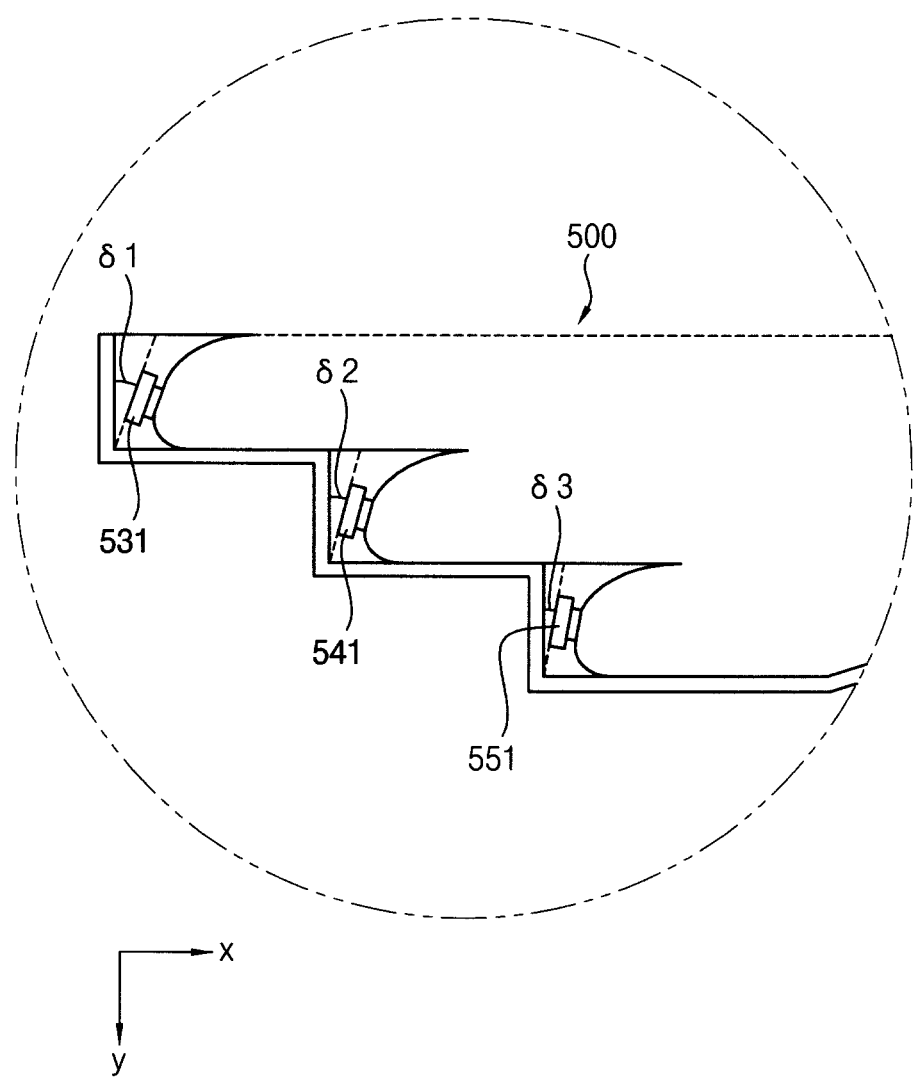
FIG. 5 is a cross-sectional view illustrating a backlight assembly according to a fifth exemplary embodiment of the present invention.

FIG. 5 is a cross-sectional view illustrating a backlight assembly according to still another exemplary embodiment of the present invention.

Referring to FIG. 5, the backlight assembly 500 is substantially the same as the backlight assembly 100 of FIG. 1, except for the angles in which each of first to third light source 531, 541 and 551 is disposed. As such, only the differences there-between will be described in detail.

Each of the first light source 531, the second light source 541 and the third light source 551 may be disposed on a surface which is inclined along the x-direction with respect to a surface perpendicular to the light exiting boundary. For example, the first light source 531 may be inclined along the x-direction x by a first angle δ1. The second light source 541 may be inclined along the x-direction x by a second angle δ2. The third light source 551 may be inclined along the x-direction x by a third angle δ3. The first to third angles δ1, δ2 and δ3 may be different from each other. For example, the second angle δ2 may be larger than the third angle δ3. The first angle M may be larger than the second angle δ2. The first to third angles δ1, δ2 and δ3 may be adjusted, so that the light from the light exiting boundary may uniformly exit. Alternatively, the first to third angles δ1, δ2 and δ3 may have various values. Many modifications of the first to third angles δ1, δ2 and δ3 may be possible.

Figure 6:
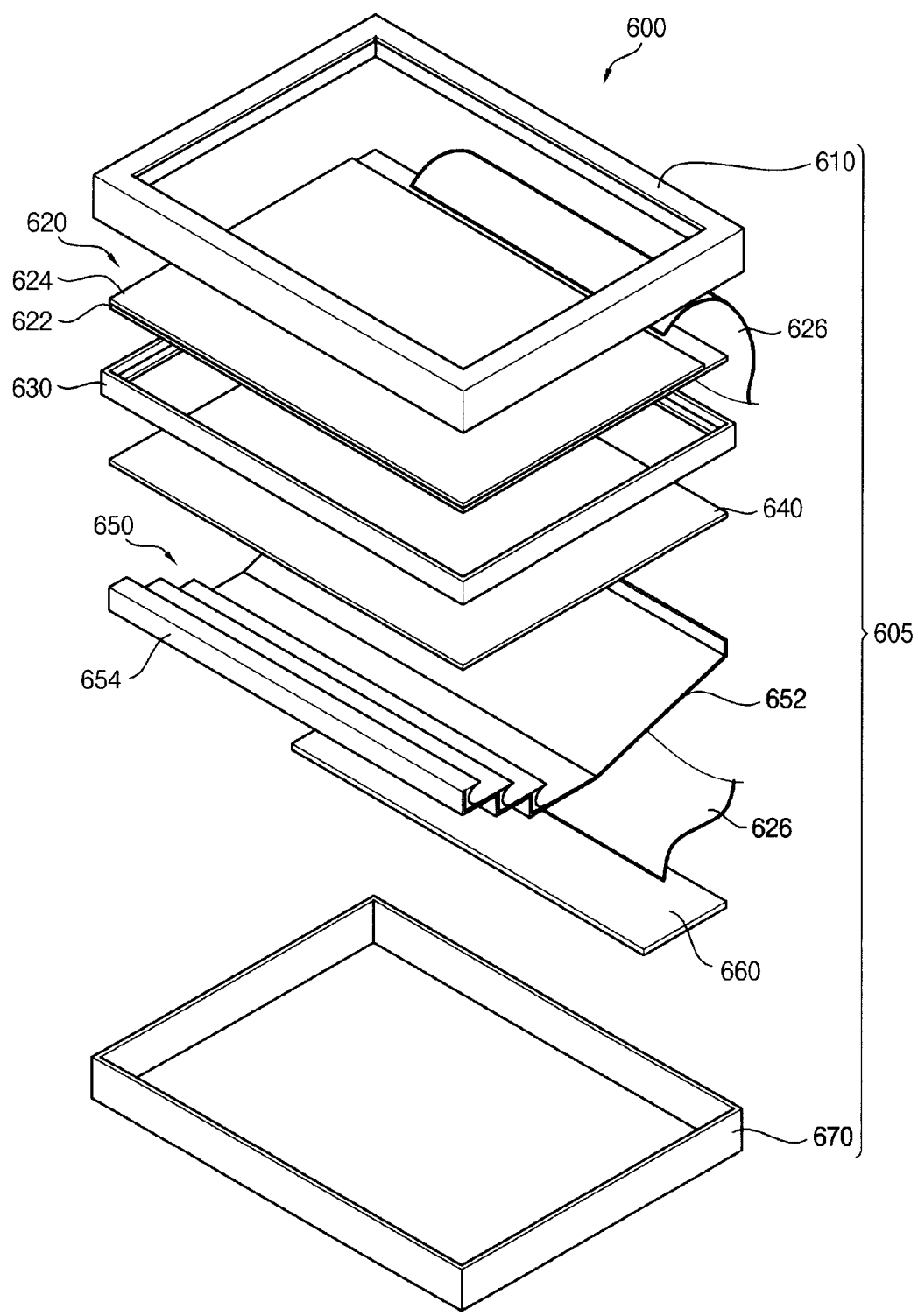
FIG. 6 is an exploded perspective view illustrating a display apparatus according to a sixth exemplary embodiment of the present invention.

FIG. 6 is an exploded perspective view illustrating a display apparatus according to an exemplary embodiment of the present invention.

Referring to FIG. 6, the display apparatus 600 includes a receiving case 605, a display panel 620, a mold frame 630, an optical sheet 640 and a backlight assembly 650. The receiving case 605 includes a top chassis 610 and a bottom chassis 670.

The top chassis 610 partly or entirely covers the display panel 620.

The display panel 620 displays an image on the display area according to a driving signal and a data signal applied from outside using a light generated from the backlight assembly 650. The display panel 620 includes an array substrate 622, an opposite substrate 624 facing the array substrate 622, and a liquid crystal layer (not shown) disposed between the array substrate 622 and the opposite substrate 624. The display panel 620 is electrically connected to the driving part 660 which drives the display panel 620. For example, a flexible printed circuit board (FPCB) 626 may connect the display panel 620 to the driving part 660. The driving part 660 may be disposed under the backlight assembly 650. The driving part 660 may be a printed circuit board on which a driving circuit to drive the display panel 620 is formed. A detailed description of the driving part 660 will be described with reference to FIG. 7.

The mold frame 630 is received in the top chassis 610 and the bottom chassis 670. The display panel 620, the optical sheet 640, and the backlight assembly 650 are received in and fixed by the mold frame 630. A space for the FPCB 626 may be formed between a side of the mold frame 630 and the bottom chassis 670.

The optical sheet 640 is disposed on the backlight assembly 650. The optical sheet 640 increases the uniformity of a brightness of the light from the backlight assembly 650. The optical sheet 640 may include a plurality of sheets. For example, the optical sheet 640 may include a protecting sheet 646, a prism sheet, 644 and a diffusion sheet 642. The diffusion sheet 642 may be disposed on the light exiting boundary of the backlight assembly 650. The prism sheet 644 may be disposed on the diffusion sheet 642. The protecting sheet 646 may be disposed on the prism sheet 644. The prism sheet 644 may further include an upper prism sheet and a lower prism sheet (not shown). Although in the exemplary embodiment of the present invention, the optical sheet 640 includes the protecting sheet 646, the prism sheet 644 and the diffusion sheet 642, the present invention is not to be construed as being limited thereto. The optical sheet may include various optical sheets.

The backlight assembly 650 is substantially same as the backlight assembly 100 of FIG. 1, and any further repetitive explanation concerning the above elements will be omitted.

The backlight assembly 650 is disposed under the optical sheet 640, and received in the bottom chassis 670. The backlight assembly 650 supplies the light from the light source part to the display panel 620.

The bottom chassis 670 is mated to the top chassis 610, so that the top chassis 610 and the bottom chassis 670 receive the display panel 620, the mold frame 630, optical sheet 640 and the backlight assembly 650.

FIG. 7 is a cross-sectional view illustrating the display apparatus of FIG. 6.

Referring to FIG. 7, the backlight assembly 650 and the bottom chassis 670 form a first space 652 and a second space 654.

A driving part to drive the display apparatus may be disposed at the first space 652 and the second space 654. A thickness of the display apparatus may be decreased as a result of the driving part disposed in the first space 652 and the second space 654. For example, the driving part 660 may be disposed in the first space 652. Thus, the driving part 660 is disposed on a bottom surface of the bottom chassis 670, so that the thickness of the display apparatus may not be increased as a result of the thickness of the driving part 660. In the present exemplary embodiment, although only disposing of the driving of the driving part 660 is explained, a driving part (not shown) to drive the light source part may be disposed in the second space 654.

Figure 8:
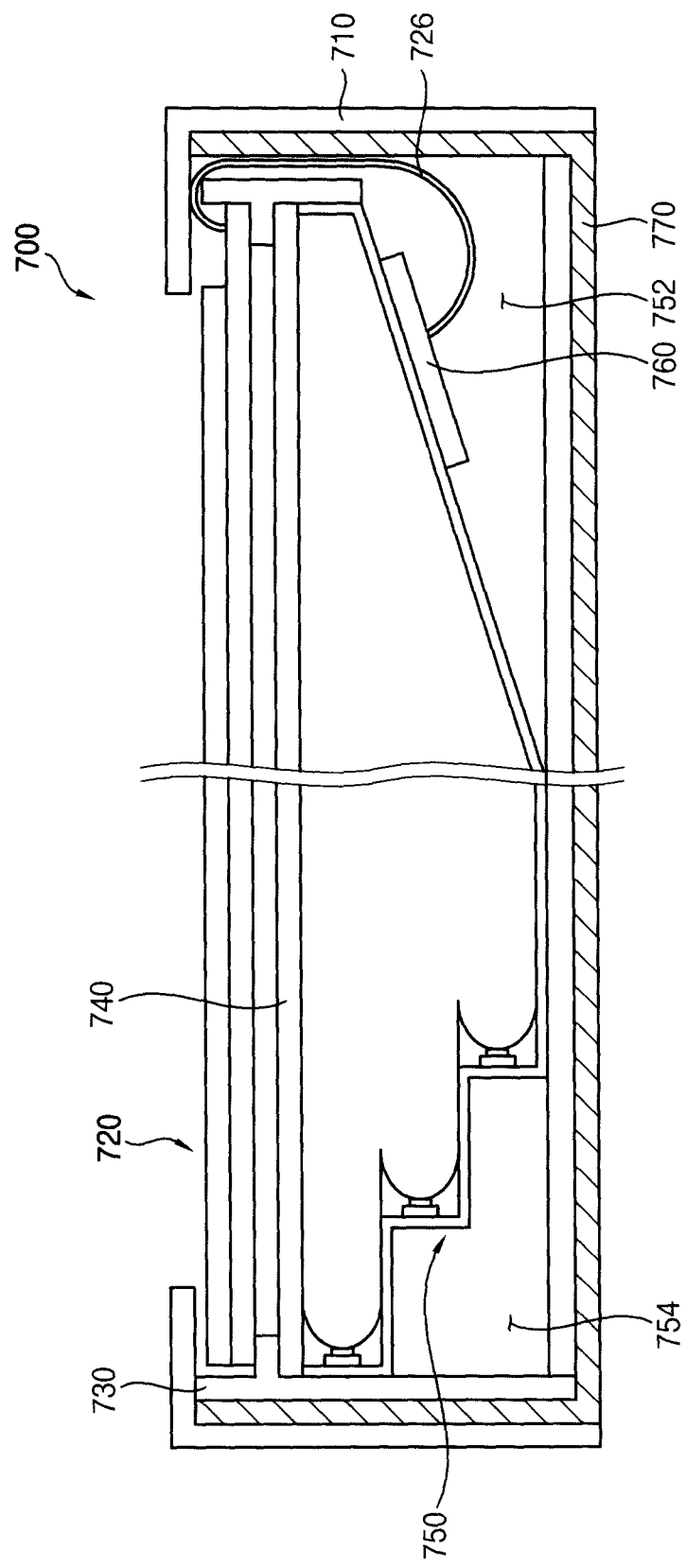
FIG. 8 is a cross-sectional view illustrating a display apparatus according to a seventh exemplary embodiment of the present invention.

FIG. 8 is a cross-sectional view illustrating a display apparatus according to another exemplary embodiment of the present invention.

Referring to FIG. 8, the display apparatus 700 is substantially the same as the display apparatus 600 of FIG. 6, except that a driving part 760 is disposed under a backlight assembly 750, and spaced apart from a bottom chassis 770. Thus, any further repetitive explanation concerning the above elements will be omitted.

The backlight assembly 750 and the bottom chassis 770 form a first space 752 and a second space 754.

A driving part to drive the display apparatus may be disposed in the first space 752 and the second space 754. A thickness of the display apparatus may be decreased as a result of the driving part disposed in the first space 752 and the second space 754. For example, the driving part 760 may be disposed in the first space 752. Thus, the driving part 760 is disposed under the backlight assembly 750, so that the thickness of the display apparatus may not be increased as a result of the thickness of the driving part 760. The driving part 760 may be attached to the backlight assembly 750. In the present exemplary embodiment, although only disposing of the driving part 760 is explained, a driving part (not shown) to drive the light source part may be disposed in the second space 754.

According to the present invention, the light source part includes a first light source part, a second light source part and a third light source part. The first to third light source parts form a stepped shape, so that brightness of light exiting from light exiting boundary may be uniform.

In addition, a space between the reflector of the backlight assembly and the light exiting boundary is empty, so that weight of the display apparatus may be decreased.

In addition, each the first to third light source may be disposed at a different angle, so that the light may uniformly exit from the light exiting boundary.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
 a container at least partially defining a light exiting boundary that extends from a first edge of the container to an opposing second edge of the container, the container comprising:
  a first light source supporting portion supporting a first light source and a second light source under the light exiting boundary, such that the first light source is disposed closer to the light exit boundary than the second light source, the first light source supporting portion forming the first edge of the container; and
  a reflector extending from the first light source supporting portion and configured to reflect the light from the first light source and the second light source toward the light exiting boundary;
 a first reflecting cup surrounding the first light source and configured to guide the light generated by the first light source toward the reflector; and
 a second reflecting cup surrounding the second light source and configured to guide the light generated by the second light source towards the reflector, wherein the second light source is spaced apart from the first light source in a first direction by a first distance, the first direction being substantially perpendicular to the first and second edges of the container and parallel with the light exiting boundary, the second light source spaced apart from the light exiting boundary in a second direction by a first depth, the second direction being substantially perpendicular to the first direction and the light exiting boundary.

2. The backlight assembly of claim 1, further comprising a third light source disposed on the first light source supporting portion, such that the third light source is further away from the light exit boundary than the second light source; and
wherein the third light source is spaced apart from the first light source by a second distance in the first direction, the second distance being greater than the first distance.

3. The backlight assembly of claim 1, wherein the first depth is about 10 mm to 15 mm.

4. The backlight assembly of claim 3, wherein the first distance is about 40 mm to 50 mm.

5. The backlight assembly of claim 1, wherein a space between the reflector and the light exiting boundary is empty.

6. The backlight assembly of claim 1, further comprising a third light source spaced apart from the second light source along the first direction by a second distance, and spaced apart from the light exiting boundary in the second direction by a second depth,
wherein the second distance is equal to or greater than the first distance.

7. The backlight assembly of claim 6, wherein the second distance is about 40 mm to 50 mm.

8. The backlight assembly of claim 7, wherein the second depth is about 15 mm to 30 mm.

9. The backlight assembly of claim 6, wherein a ratio of the first distance, the second distance, the first depth and the second depth to each other is about 4.5:4.5:1:2.

10. The backlight assembly of claim 1, wherein the reflector comprises a flat portion extending from the first light source supporting portion and a first inclined portion extending from the flat portion, and
the flat portion is substantially parallel with the light exiting boundary, and the first inclined portion and the flat portion form a first angle.

11. The backlight assembly of claim 10, wherein a length of the first inclined portion is greater than a length of the flat portion in the first direction.

12. The backlight assembly of claim 1, further comprising:
a second light source supporting portion connected to the reflector, the second light source supporting portion disposed opposite the first light source supporting portion with respect to the reflector;
a third light source disposed on the second light source supporting portion, and facing the first light source; and
a fourth light source disposed on the second light source supporting portion, and facing the second light source.

13. The backlight assembly of claim 12, wherein the reflector comprises a first inclined portion extending from the first light source supporting portion, a second inclined portion extending from the first inclined portion, a third inclined portion extending from the second inclined portion, and a fourth inclined portion extending from the third inclined portion and connected to the second light source supporting portion, and
the first inclined portion and the fourth inclined portion form a first angle with respect to the light exiting boundary, and the second inclined portion and the third inclined portion form a second angle with respect to the light exiting boundary.

14. The backlight assembly of claim 1, wherein the reflector is inclined by an angle with respect to the light exiting boundary, and the angle is gradually increased along the first direction.

15. A backlight assembly comprising:
a container at least partially defining a light exiting boundary, the container comprising:
a first light source supporting portion supporting a first light source and a second light source; and
a reflector extending from the first light source supporting portion and configured to reflect the light from the first light source and the second light source toward the light exiting boundary, the reflector comprising a flat portion extending substantially parallel with the light exiting boundary, a first inclined portion extending at a first angle from the flat portion towards the light exiting boundary, and a second inclined portion disposed between the flat portion and the first light source supporting portion, and the second inclined portion extending at a second angle from the flat portion, wherein,
the first light source is disposed under the light exiting boundary, and
the second light source is spaced apart from the first light source in a first direction by a first distance, the first direction being substantially parallel with the light exiting boundary, the second light source spaced apart from the light exiting boundary in a second direction by a first depth, the second direction being substantially perpendicular to the light exiting boundary.

16. The backlight assembly of claim 15, wherein a length of the first inclined portion in the first direction is greater than a sum of a length of the second inclined portion and a length of the flat portion.

17. The backlight assembly of claim 15, wherein the container further comprises:
a first reflecting cup surrounding the first light source and configured to guide the light generated by the first light source along the first direction; and
a second reflecting cup surrounding the second light source and configured to guide the light generated by the second light source along the first direction,
wherein each of the first light source and the second light source is disposed on a surface that is substantially perpendicular to the light exiting boundary.

18. The backlight assembly of claim 17, wherein each of the first reflecting cup and the second reflecting cup has an upper potion and lower portion, the upper portion is closer to the light exiting boundary than the lower portion, and the upper portion is longer than the lower portion in the first direction.

19. The backlight assembly of claim 17, wherein the first light source is disposed on a first surface inclined by a first inclined angle with respect to the surface substantially perpendicular to the light exiting boundary,
the second light source is disposed on a second surface inclined by a second inclined angle with respect to the surface substantially perpendicular to the light exiting boundary.

20. The backlight assembly of claim 19, further comprising a third light source spaced apart from the second light source along the first direction by a second distance, and spaced apart from the second light source along the second direction by a second depth, the third light source is disposed on a third surface inclined by a third inclined angle with respect to the surface substantially perpendicular to the light exiting boundary, the first inclined angle, the second inclined angle and the third inclined angle are different from each other.

21. The backlight assembly of claim 20, wherein the first inclined angle is greater than the second inclined angle, and the second inclined angle is greater than the third inclined angle.

22. A display apparatus comprising:
a display panel displaying an image;
a backlight assembly comprising:
   a container at least partially defining a light exiting boundary that extends from a first edge of the container to an opposing second edge of the container, the container comprising:
      a first light source supporting portion supporting a first light source and a second light source under the light exiting boundary, such that the first light source is disposed closer to the light exit boundary than the second light source, the first light source supporting portion forming the first edge of the container; and
      a reflector extending from the first light source supporting portion and configured to reflect the light from the first light source and the second light source toward the light exiting boundary;
   a first reflecting cup surrounding the first light source and configured to guide the light generated by the first light source toward the reflector;
   a second reflecting cup surrounding the second light source and configured to guide the light generated by the second light source towards the reflector; and
a case receiving the display panel and the backlight assembly,
wherein the second light source is spaced apart from the first light source in a first direction by a first distance, the first direction being substantially perpendicular to the first and second edges of the case and parallel with the light exiting boundary, the second light source spaced apart from the light exiting boundary in a second direction by a first depth, the second direction being substantially perpendicular to the first direction and the light exiting boundary.

23. The display apparatus of claim 22, wherein the display panel comprises a driving part configured to drive the display panel, and
a space is formed between the backlight assembly and a bottom surface of the case, and the driving part is disposed in the space.

24. The display apparatus of claim 22, further comprising an optical sheet disposed between the display panel and the backlight assembly,
wherein the optical sheet comprises at least one of a diffusion sheet disposed on the backlight assembly, a prism sheet disposed on the diffusion sheet, and a protection sheet disposed on the prism sheet.

* * * * *